United States Patent [19]
Oyen et al.

[11] Patent Number: 5,487,668
[45] Date of Patent: Jan. 30, 1996

[54] SET OF BLOCKS FOR MAKING DESIGNS

[75] Inventors: Margaret A. Oyen, Rhinebeck; Linda Baldwin, Pine Plains, both of N.Y.

[73] Assignee: Mill Hill Factory, Inc., Rhinebeck, N.Y.

[21] Appl. No.: 150,394

[22] Filed: Nov. 9, 1993

[51] Int. Cl.$^6$ .................................................. G09B 19/00
[52] U.S. Cl. ............................................................. 434/98
[58] Field of Search ................................. 434/96, 98, 81; 273/157 R

[56] References Cited

U.S. PATENT DOCUMENTS

| | | | |
|---|---|---|---|
| 1,573,358 | 2/1926 | Ross | 273/157 R |
| 1,714,127 | 5/1929 | Graham | 273/157 R |
| 1,987,496 | 1/1935 | Springborn | 273/157 R |
| 3,302,311 | 2/1967 | Israel. | |
| 3,464,145 | 9/1969 | Martin. | |
| 3,643,956 | 2/1972 | Bovasso. | |
| 3,759,522 | 9/1973 | Hodan, III. | |
| 3,987,558 | 10/1976 | Tsukamoto | 434/96 |
| 4,021,939 | 5/1977 | May. | |
| 4,177,993 | 12/1979 | Crosby et al.. | |
| 4,508,347 | 4/1985 | Shettler. | |
| 4,741,534 | 5/1988 | Rogahn. | |
| 5,108,291 | 4/1992 | Kuo. | |

FOREIGN PATENT DOCUMENTS 1175447  12/1969  United Kingdom ............... 273/157 R

*Primary Examiner*—Thomas Price
*Attorney, Agent, or Firm*—Woodard, Emhardt, Naughton Moriarty & McNett

[57] ABSTRACT

A portable base frame with a lid contains a set of 49 cubes, each cube having a different primary or secondary color on each different face thereof. Twenty-five of the cubes have one black face, and twenty-four have one white face, but none have both a black and a white face. The cubes rest on a framed board area with an odd number of spaces designated thereon for deposit of the cubes thereon, one in each space. Each of the spaces has an aperture under the cube to facilitate pushing the cube up from under the board. The base has foldable legs with a resilient band normally keeping each leg toward the folded position. With the lid removed, the cubes can be arranged in various patterns for different lessons or visual effects.

11 Claims, 5 Drawing Sheets

Fig. 7

SET OF BLOCKS FOR MAKING DESIGNS

BACKGROUND OF THE INVENTION

1. Field of the Invention

This invention relates generally to educational toys and more particularly to a set of cubical blocks with particular color combinations and a board for arrangement of the blocks in various patterns.

2. Description of the Prior Art

In the field of education, various media have been used for teaching young people how to draw, color and design. One type of device for such purpose is a set including plates or blocks used on a board and having both the educational and entertainment aspects. Examples are shown in the U.S. patents as follows:

| U.S. Pat. No. | Inventor | Date Issued |
| --- | --- | --- |
| 3,302,311 | Israel | 2/07/67 |
| 3,464,145 | Martin | 9/02/69 |
| 3,643,956 | Bovasso | 2/22/72 |
| 3,759,522 | Hodan, III | 9/18/73 |
| 4,021,939 | May | 5/10/77 |
| 4,177,993 | Crosby et al. | 12/11/79 |
| 4,508,347 | Shettler | 4/02/85 |
| 4,741,534 | Rogahn | 5/03/88 |
| 5,108,291 | Kuo | 4/28/92 |

The Martin patent discloses a set of blocks for generating designs within a confinement frame. Each of the blocks has patterns on various faces.

The Rogahn patent shows a multi-block puzzle having a plurality of cubes with each cube having a portion of a picture on each of its six faces.

The Israel patent discloses a set of blocks with designs on the faces thereof, the blocks being apertured for stacking on vertical shafts.

The Kuo patent discloses blocks of rectangular or triangular shape and minimal thickness, for teaching basic mathematical concepts. Each of the "blocks" is of a solid color.

The Shettler patent discloses cubes having different arrangements of indicia in the form of colored dots arranged in different faces so that by various and appropriate combinations of the nine blocks, all of the letters of the alphabet can be created.

The May patent discloses a set of cubes organized to create a pattern which can be changed to create the appearance of movement of the figures when the blocks are moved in a designated pattern. The Bovasso patent has some similarities in the respect of providing movement for continuity of a pattern as pieces are removed and replaced.

The Crosby patent is more in the nature of a puzzle, and the Hodan patent discloses a combination puzzle and board game.

Although each of these patents discloses a device which can be educational or entertaining or both, there remained a need for an educational device in a three dimensional configuration which is useful for teaching about designs, color and color combinations, and is also entertaining. The present invention addresses that need.

SUMMARY OF THE INVENTION

According to a typical embodiment of the present invention, a plurality of cubes is provided, each of the cubes having a different color on each different face thereof. The colors are some primary and some secondary. Some of the cubes have one black face, and some have one white face, but no cubes have both black and white faces. The cubes are placed on a base frame having an area with an odd number of spaces designated thereon for deposit of the cubes thereon, one in each space. The spaces on the base are the same in number as the number of cubes. Half of the cubes have one of the colors black or white on one face thereof, and the remaining cubes have the other of the colors black or white on one face thereof. The cubes are arranged in various patterns for different lessons or visual effects.

BRIEF DESCRIPTION OF THE DRAWINGS

FIG. 7 is a chart representing the various color combinations of the 49 cubes.

DESCRIPTION OF THE PREFERRED EMBODIMENT

Figure 1:
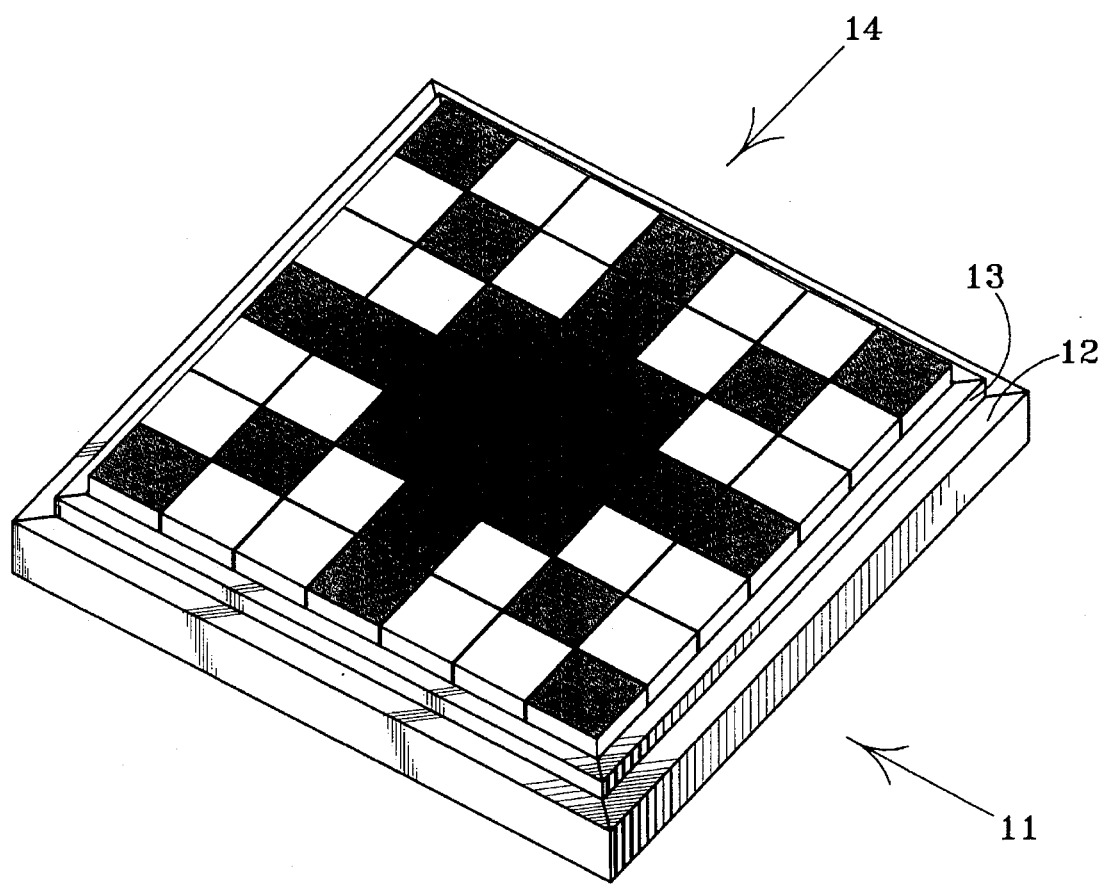
FIG. 1 is a pictorial view of the block and frame set according to a typical embodiment of the present invention and showing one of the many possible design patterns which can be made with it.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, and particularly FIG. 1, there is a square base 11 having a ledge 12 and a wall 13 extending above the ledge providing a frame around a set of cubes 14. In the illustrated example, there are 49 cubes which are identical in size and shape. The only difference is in the color.

The blocks rest on a perforated board 16 (FIGS. 2 and 3) which is received and supported on an inwardly extending shelf 17 in the base 11. The wall 13 sits on the edge of the board in the base and is confined by the 11 and, itself, provides a frame for the set of cubes. A lid 18 fits down around the frame wall 13, and the lower edge 19 of the lid rests on the ledge 12 of the 11. Latches 21 at two ends of the base 11 secure the lid to the base. The lower inside face 22 of the top of the lid 18 is closely spaced to the tops 14T of the cubes to minimize rattling when the set is being transported. However, space is provided to provide a set of instructions between the tops 14T of the cubes, and the lid.

Figure 4:
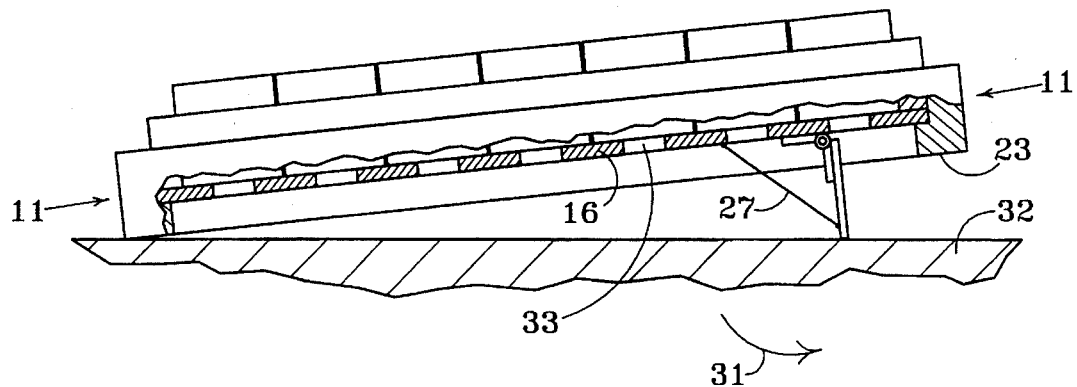
FIG. 4 is a view similar to FIG. 3 but showing the support legs extended.

The frame wall 13 extends completely around the set and it is square, the columns and rows of cubes being identical in numbers of units. The base 11 extends down somewhat below the board 16, and the lower perimetrical edge 23 of the base 11 can normally rest on any support surface when the two support legs 24 are folded as shown in FIG. 4. Legs 24 are mounted to the bottom of the base by hinges 26 (piano hinges being suitable, for example) and are normally restrained in the folded condition by a resilient member 27 fastened to the base 28 at and to the top of the leg at 29. Spring wire is an example but a rubber band or other device might be used to keep a leg folded.

When the lid is removed and the device ready to use, the legs are swung down in the direction of arrow 31 to the position shown in FIG. 4 whereupon the device is supported at a slight angle on the support surface 32. This makes it easy for finger access under the lower edge of the frame to any of the 49 apertures 33 in the base to assist in removing a cube, particularly when the frame is completely full of all 49 cubes.

Figure 2:
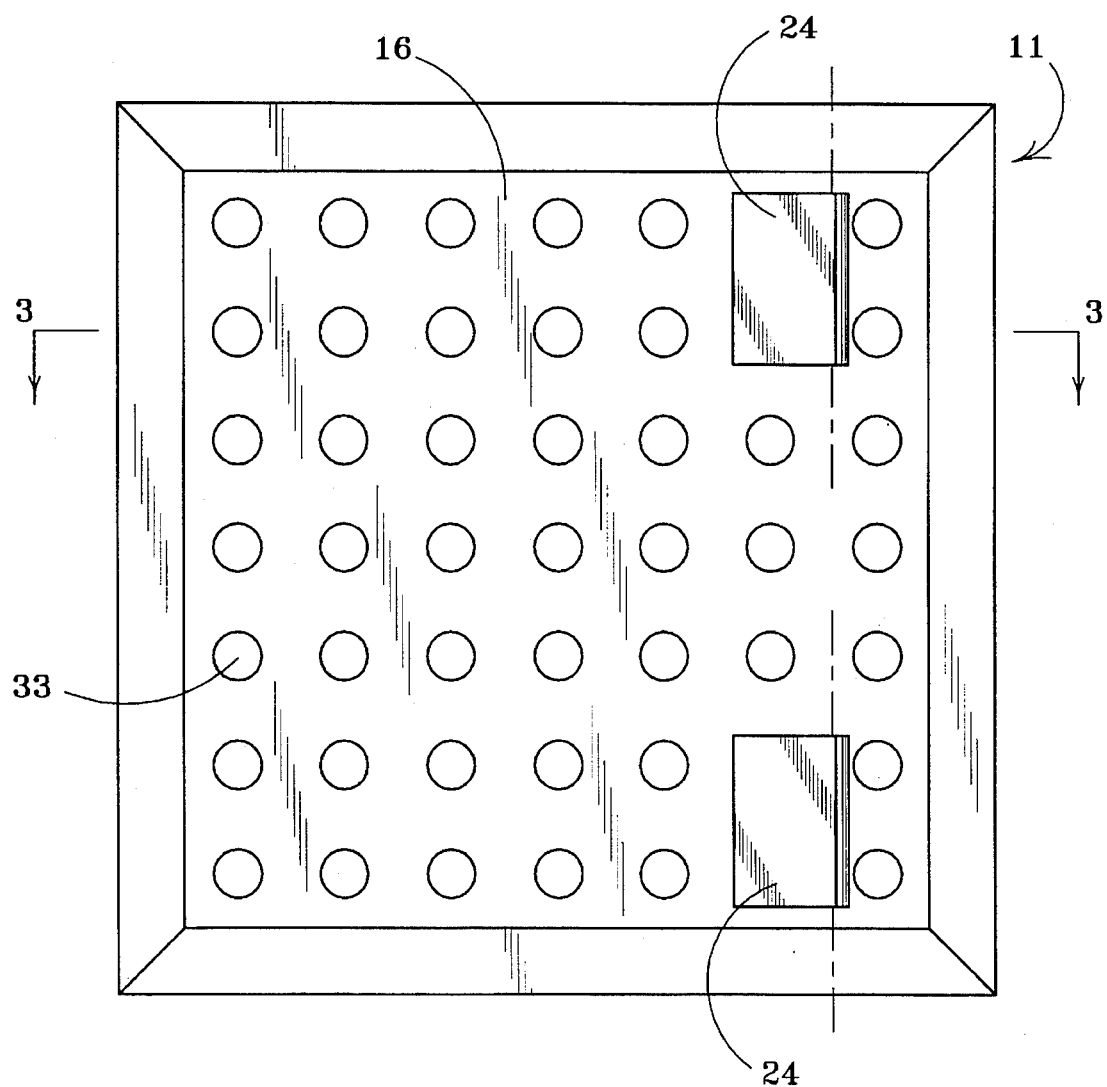
FIG. 2 is a bottom plan view of the frame set.
Figure 3:
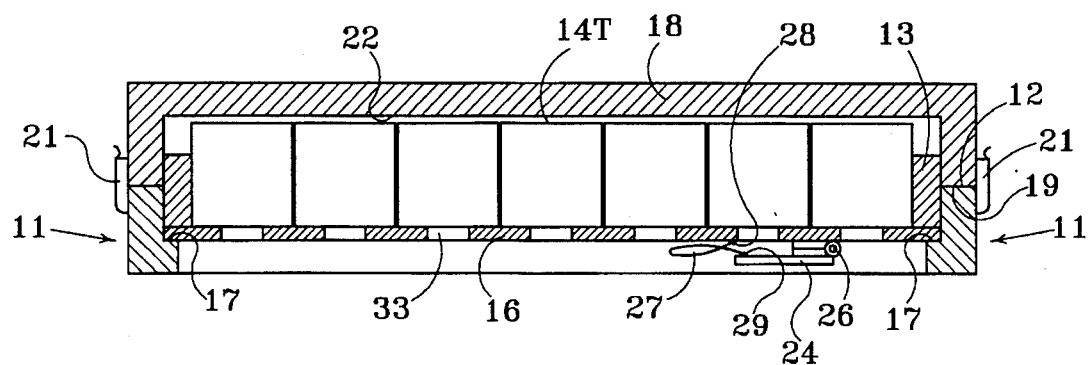
FIG. 3 is a cross section taken at line 3—3 in FIG. 2 and viewed in the direction of the arrows.
Figure 5:
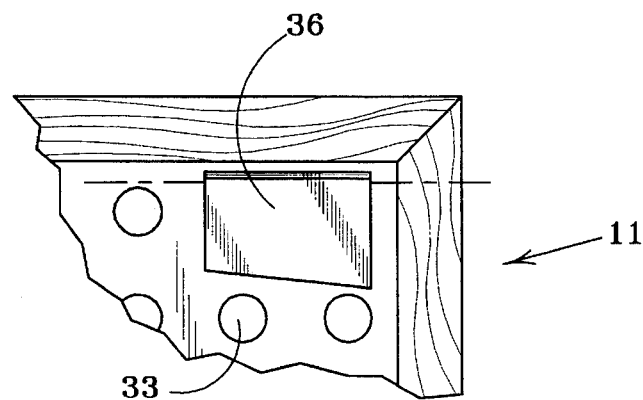
FIG. 5 is fragmentary bottom plan view showing an alternate arrangement of support legs.
Figure 6:
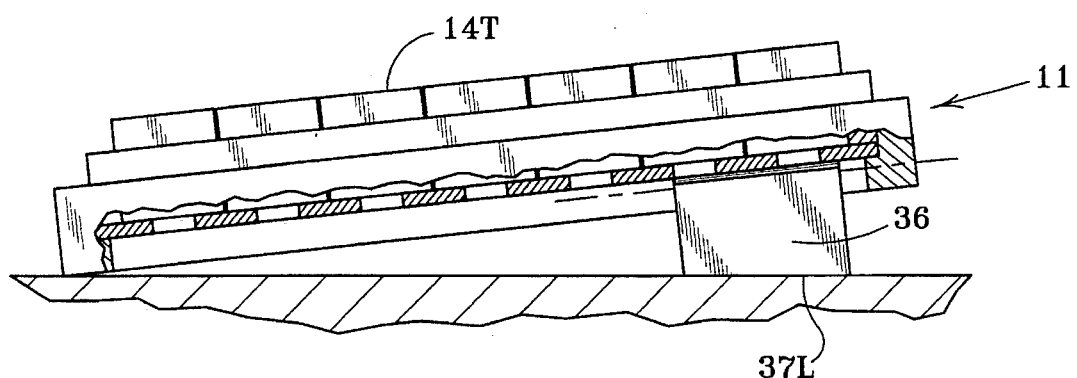
FIG. 6 is a partly cross-sectional view of the block and frame set with the FIG. 5 leg extended.

FIG. 5 shows an alternate construction in which the legs 36 fold about axes oriented in the other direction. In other words, there is a leg at each of the two corners where the legs are shown in FIG. 2, but they pivot about axes oriented 90° to that in FIG. 2. Therefore, the legs are slightly trapezoidal in shape so that the lower edge 37L rests flat on the support surface when the leg is extended and the frame is inclined to an angle such as shown in FIG. 6.

Figure 7:
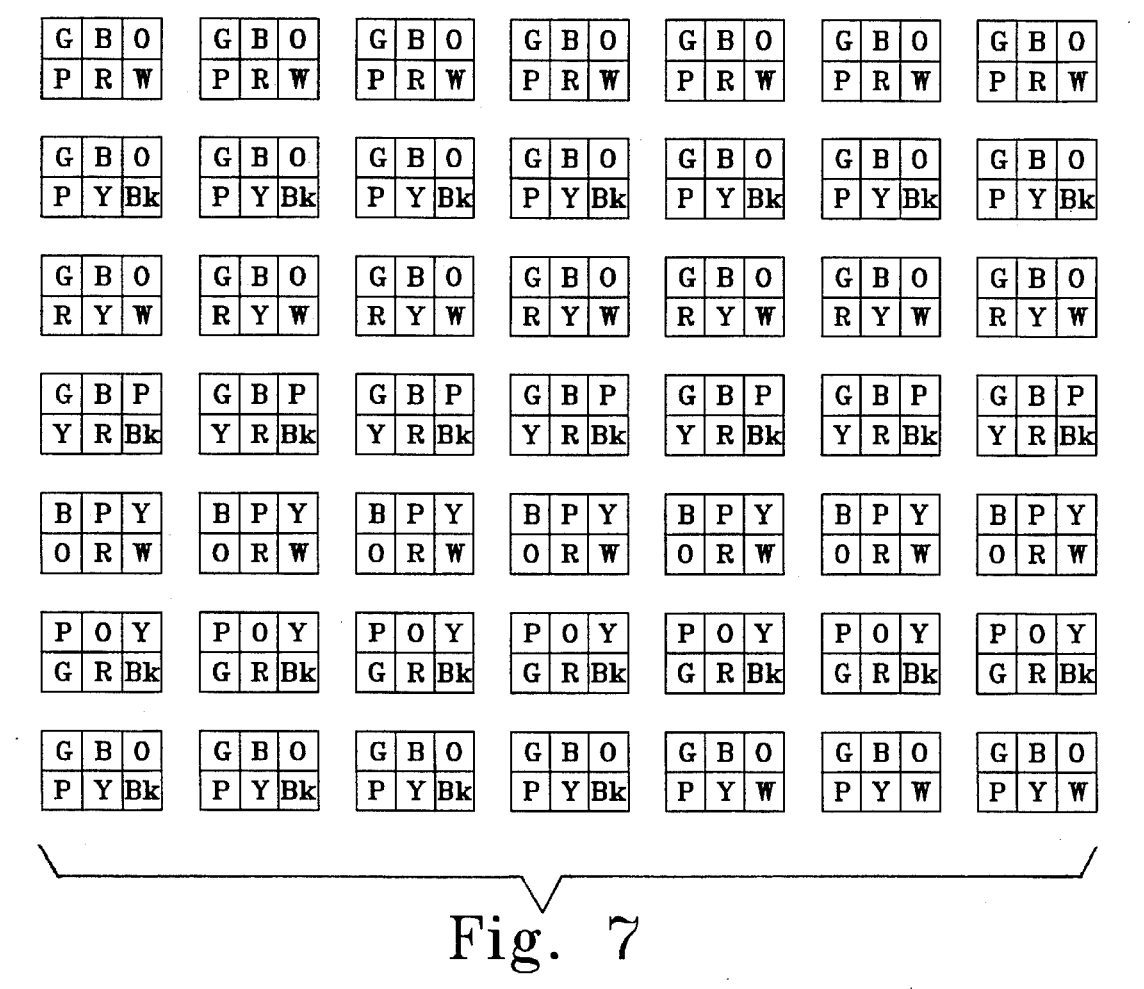

An important feature of the invention is the fact that all of the cubes have each of their six faces distinguished from each other face by color. In this context, it should be understood that white and black are considered colors. Since one purpose of this invention is to help students understand relationships of color, each of the blocks has at least two of the three primary colors red (R), yellow (Y) and blue (B), and two of the secondary colors orange (O), green (G), and purple (P) on it. Also, at least half of the blocks has one face that is white (W) and at least half has one face that is black (BK). In the illustrated example represented by the chart of FIG. 7, there are seven blocks which have faces with one of each of the colors white, red, blue, purple, green and orange. There are seven which have the combination of white, red, blue, yellow, green and orange. There are seven which have the combination of red, blue, purple, yellow, orange and white. There are seven which have the combination of black, blue, yellow, green, orange and purple. There are seven which have the combination of black, red, blue, purple, green and yellow. There are seven which have the combination of black, red, yellow, orange, purple and green. There are four which have the combination of black, blue, yellow, green, orange and purple. There are three having the combination of white, blue, yellow, green, orange and purple. Every block that has a black face, also has a green, yellow, and purple face. Every block that has a white face has an orange and a blue face. Thus, out of the 294 cubes in this example, 24 of them have a white face, 25 of them have a black face, 35 have a red face, and for each of the other five colors, orange, yellow, green, blue and purple, there are 42 blocks having that color on them.

These cubes can be arranged in various patterns of black and white. One example is shown in FIG. 1 where the shaded blocks represent the black faces of the cubes at those locations, and the unshaded blocks represent white faces of the cubes at the remaining locations. Various other arrangements and patterns of color can be provided and arranged according to a student instruction booklet and which relate the various primary colors of red, yellow and blue and secondary colors of orange, green and purple. Also, of course, the user has the opportunity to create a great variety of original designs.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A designing set comprising:

a plurality of cubes, each cube having six faces;

a work base having an area with an odd number of spaces designated thereon for deposit of the cubes thereon, one in each space, the spaces on the base being the same in number as the number of cubes, each face of each of the cubes being distinguished from each other face of the cube by a color different from colors distinguishing each other face of the cube, one face of half of the cubes plus one of the cubes being distinguished by one or the other of the colors black or white, and one face of the remaining cubes being distinguished by the other of the colors black or white, and no face of the remaining cubes being distinguished by the color that distinguishes said one face of the said half of the cubes.

2. A designing set comprising:

a plurality of cubes, each cube having six faces;

a work base having an area with an odd number of spaces designated thereon for deposit of the cubes thereon, one in each space, the spaces on the base being the same in number as the number of cubes, each face of each of the cubes being distinguished from each other face of the cube by a color different from colors distinguishing each other face of the cube, one face of half of the cubes plus one of the cubes being distinguished by one or the other of the colors black or white, and one face of the remaining cubes being distinguished by the other of the colors black or white, each of the cubes having a second face distinguished by one primary color, a third face distinguished by a second primary color, a fourth face distinguished by a secondary color, and a fifth face distinguished by a second secondary color.

3. The set of claim 1 and wherein: each of the spaces has an aperture therein through the base to facilitate removal of the cube from the space.

4. The set of claim 1 and wherein:

the number of spaces is 49, and there are 49 cubes in those spaces.

5. The set of claim 4 and wherein:

25 of the cubes have a black face, and 24 of the cubes have a white face.

6. The set of claim 5 and wherein:

the cubes having a black face have no white face, and the cubes having a white face have no black face.

7. The set of claim 6 and wherein:

seven of the white-face cubes have red, blue, purple, green and orange faces;

seven of the white-faced cubes have red, blue, yellow, green and orange faces;

seven of the white-faced cubes have read, blue, yellow, purple and orange faces;

three of the white-faced cubes have yellow, blue, purple, green and orange faces;

eleven of the black-faces cubes have yellow, blue, purple, green and orange faces;

seven of the black-faced cubes have red, blue, yellow, purple and green faces; and seven of the black-faced cubes have red, yellow, purple, green and orange faces.

8. The set of claim 1 and wherein:

a frame is mounted on the base and provides a wall projecting up from the base a distance less than the height of the cubes.

9. The set of claim 8 and wherein the base has a bottom; and each of the spaces has an aperture through the bottom of the base to facilitate removal of one of the cubes from the space.

10. The set of claim 9 and further comprising: foldable legs under the base and operable, when unfolded, to raise the base from a support surface for access to the bottom of the base and thereby to the apertures therein from under the base when the base is resting on a support surface.

11. The set of claim 9 and wherein:

the wall has a top; and the has a perimetrical ledge outboard of the wall and below the top of the wall, the set further comprising:

a lid sized to cover the cubes in the frame and having a portion surrounding the frame wall and resting on the ledge.

\* \* \* \* \*

UNITED STATES PATENT AND TRADEMARK OFFICE
CERTIFICATE OF CORRECTION

PATENT NO. : 5,487,668
DATED : January 30, 1996
INVENTOR(S) : Margaret A. Oyen and Linda Bladwin It is certified that error appears in the above-indentified patent and that said Letters Patent is hereby corrected as shown below:

Column 2, line 54, before "11" insert --base--.

Column 2, line 57, before "11" insert --base--.

Column 4, line 61, change "read" to --red--.

Column 4, line 65, change "black-faces" to --black-faced--.

Signed and Sealed this

Eighteenth Day of June, 1996

Attest:

BRUCE LEHMAN

*Attesting Officer*    *Commissioner of Patents and Trademarks*